Mar. 13, 1923.                                               1,448,157.
J. SELIK.
BEARING.
FILED JAN. 17, 1920.
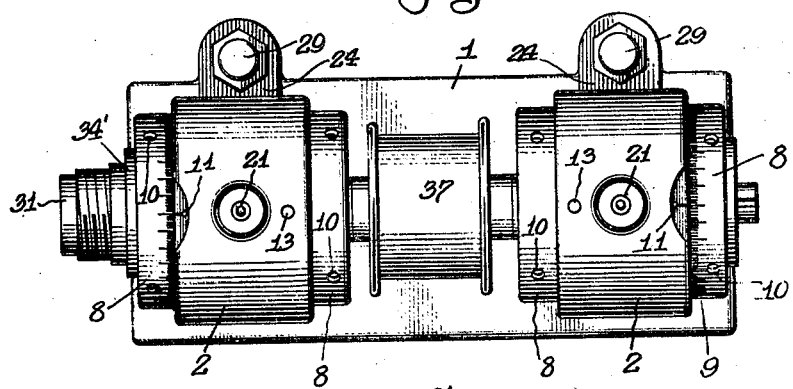
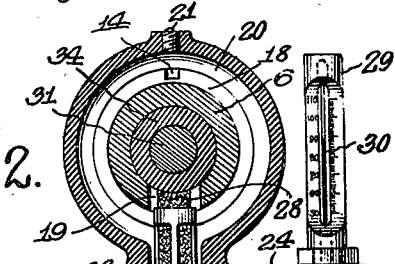
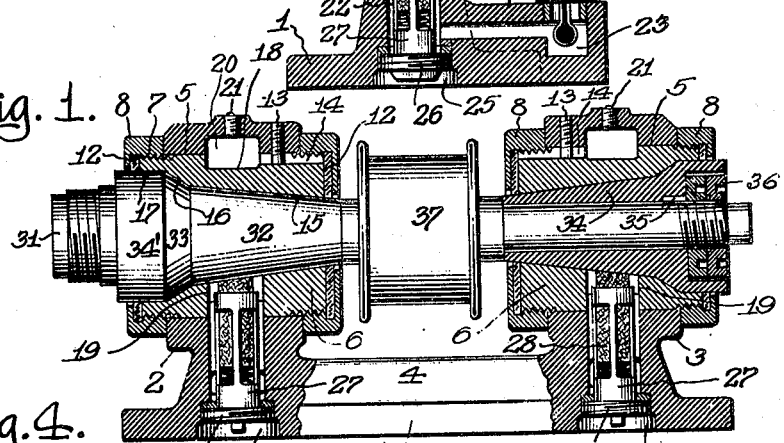
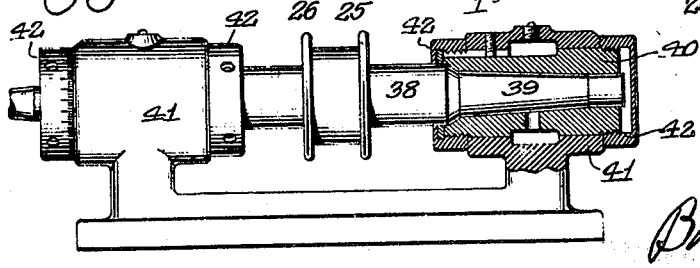
Inventor
Joseph Selik,
Barthel & Barthel
Attorneys Patented Mar. 13, 1923.

1,448,157

UNITED STATES PATENT OFFICE.

JOSEPH SELIK, OF DETROIT, MICHIGAN.

BEARING.

Application filed January 17, 1920. Serial No. 352,092.

*To all whom it may concern:*

Be it known that I, JOSEPH SELIK, a citizen of the United States of America, residing at Detroit, in the county of Wayne and State of Michigan, have invented certain new and useful Improvements in Bearings, of which the following is a specification, reference being had therein to the accompanying drawing.

In metal working machines it is desirable that the spindle or rotating member should be held firmly against longitudinal movement to insure the accuracy of the operation on a piece of work, and at the same time it is equally desirable that the spindle should be held from "chattering" or working loose in its bearings. The shafts, spindles and rotating members of grinding machines, journal boxes, and other apparatus are also susceptible to change due to wear in connection with the bearings, and while some provision has been made heretofore for adjusting bearings, it has been practically impossible to determine the exact amount of adjustment required. This is particularly true where two bearings support a single spindle, shaft or rotating member, and very often the bearing supporting one portion of the shaft will receive more or less adjustment than the other bearing, so that there is an inequality that either produces excessive wear, a loose shaft or imperfect alinement.

The primary object of my invention is to provide novel bearings for a spindle shaft or rotating member which may be easily and quickly adjusted to compensate for wear and insure proper alinement of the spindle, shaft or rotating member, the bearings being constructed to withstand end thrust and permit of a minute adjustment so that there will be no inequalities whatsoever in the supporting means of the spindle, shaft or rotating member.

Another object of my invention is to provide a thermal method of ascertaining the adjustment necessary in connection with the bearings of a spindle or shaft, and associated with each bearing is a micrometer adjustment so that after the thermal condition of the bearings has been ascertained, said bearings may be minutely adjusted to have a similar relation to the spindle or shaft supported thereby, and in this manner prevent one bearing from being worn more than the other and the spindle or shaft supported other than in perfect alinement.

A further object of this invention is to provide bearings wherein the parts are constructed with a view of reducing the cost of manufacture and at the same time retain those features by which durability and ease of assembling and adjustment are secured. With such ends in view, my invention resides in the novel construction to be hereinafter considered and then claimed, and reference will now be had to the drawings, wherein Figure 1 is a longitudinal sectional view of bearings in accordance with this invention;

Fig. 2 is a cross sectional view of one of the bearings;

Fig. 3 is a plan of the bearings, and

Fig 4 is a side elevation of one bearing with another in section, showing a slight modification of this invention.

In the drawing, the reference numeral 1 denotes a base having spaced cylindrical housings 2 and 3 connected by a longitudinal web or rib 4 on the base 1, and said cylindrical housings have alining bores 5, for bearings 6, said bearings being identical in construction, but reversely arranged, as shown in Fig. 1. Each of the bearings 6 has its ends exteriorly screwthreaded, as at 7, to accommodate micrometer collars 8 which abut the ends of each housing and may be rotated to shift the bearings 6 longitudinally of the housings and fix them in a desired position. The periphery of each collar 8 has micrometer calibrations 9 and sockets 10, the latter accommodating a spanner wrench or suitable instrument so that the collar may be adjusted with its calibrations moving relative to indicia 11 on the housing adjacent the collar. The collar also serves as a stuffing box or container for a packing gland or ring 12 and each bearing is prevented from rotating in its housing by a detachable pin 13 extending into longitudinal groove 14 provided therefor in the inner end of each bearing.

Each of the bearings 6 is formed with a long tapered seat 15, a short tapered seat 16, and a cylindrical seat 17, the seats 16 and 15 being adjacent the outer end of each bearing. Each bearing is furthermore provided with a peripheral groove 18 and a radially disposed port 19, said groove and port communicating with an annular channel 20 in the inner wall of the housing. This is best shown in Fig. 2, and the groove, port and channel are provided for lubricating purposes.

The top of each housing has a detachable plug 21 so that oil or other lubricant can be placed in each housing, and the bottom of each housing has a well 22 communicating with a thermometer chamber 23 formed in a side extension 24 at the base of the housing.

Each well 22 is adapted to communicate with an opening 25 in the base 1 and said opening is normally closed by a plug 26 supporting a cage 27 within the well 22 and in said cage is a spring pressed lubricant feeding device 28, as a piece of felt or any material that may conduct a lubricant by capillary attraction. The feeding device 28 extends through a channel 20, the groove 18 and the port 19 to constantly conduct lubricant from the well 22, as will hereinafter appear. With the plug 26 and the cage 27 detachable it is possible to remove the same and flood the well so as to remove grit and other foreign matter therefrom.

The side extension 24 of each housing is provided with a vertically disposed guard or shield 29 for a thermometer 30, said thermometer having its bulb or lower end within the chamber 23, so the temperature of the lubricant within the chamber 23 may be ascertained by observing the thermometer 30.

Extending through the bearings 6 is a spindle, shaft or rotatable member 31 and that end of the spindle, within the bearing of the housing 2, has a long conical portion 32, a short conical portion 33 and a cylindrical portion 34', these portions being integral with the spindle 31 and rotating on the seats 15, 16 and 17 of the bearing 6 within the housing 2.

Detachably mounted on the spindle 31, in the bearing 6 of the housing 3 is a sleeve 34 possessing conical and cylindrical portions similar to those portions designated 32, 33 and 34', and this sleeve is detachable in order that the spindle 31 may be assembled relative to the bearings 6 of the housings 2 and 3. The sleeve 34 is held against rotation relative to the spindle 31 by a key 35 or other fastening means and consequently the sleeve is as though it were integral with the spindle 31, although it has a sliding movement on the spindle so that it may be adjusted relative thereto by a series of nuts 36 adjustable on the spindle. The nuts 36 are housed within the outer ends of the sleeve 34 and may be adjusted in the spindle relative to the bearings 6.

On the spindle 31, intermediate its ends, is a pulley or power receiving member 37 by which power may be transmitted to the spindle, and suitable provision may be made for coupling any tool or other device to the spindle or the spindle may represent a work shaft.

In Fig. 4 there is illustrated a slight modification of my invention, wherein the spindle 38 has conical ends 39 extending into bearings 40 within connected housings 41. The bearings 40 can be inserted in the outer ends of the housings 41 and said bearings may be minutely adjusted by micrometer collars 42 on the ends of said bearings. The same lubricating system used in the preferred form of construction may be employed in connection with this modification, and further considering the lubrication system, the following is to be noted.

When the housings 2 and 3 are supplied with lubricant, the thermometer 30 will register the temperature of the lubricant and should any friction between the spindle 31 and the bearings 6 produce heat, it is obvious that the lubricant will be more or less heated and through the medium of the thermometer 30 it will be possible for the artisan to discover in which housing the friction exists. It is now apparent that a system and method of lubrication can be worked out that an artisan will be aware of actual conditions in each housing and may make necessary adjustments to insure a perfect working condition of the spindle. By the micrometer calibrations of the collars 8 it is possible to very minutely shift the bearings 6 in either direction, and thus compensate for wear and prevent chattering of the spindle in its bearings. The conical portions of the spindle engaging the tapered seats of the bearings will prevent binding of the spindle, take care of end thrust, and at the same time permit of the spindle being maintained in perfect alinement relative to a piece of work or a line shaft from which the spindle derives its power.

It is thought that the operation and utility of my invention will be apparent without further description, and while in the drawings there are illustrated the preferred embodiments of the invention, it is to be understood that the structural elements are susceptible to such variations and modifications as fall within the scope of the appended claims.

What I claim is:—

1. A spindle bearing comprising a housing having a well for lubricant, an adjustable spindle bearing in said housing, lubricant feeding means in the housing well, means for ascertaining the temperature of the lubricant in the housing well, and means to facilitate adjusting the spindle bearing in accordance with the temperature of the lubricant in the well of said housing.

2. A spindle bearing as characterized in claim 1, wherein the bearing has an annular groove communicating with a channel in said housing and both groove and channel communicating with the lubricant well.

3. A spindle bearing as characterized in claim 1, wherein the last mentioned means includes micrometer collars adjustable on the ends of said bearings and abutting said housings.

4. A bearing comprising housings, bearings in said housings, micrometer collars on said bearings against said housings for longitudinally shifting said bearings, a spindle movable axially of said bearings and engaging one of said bearings, a sleeve on said spindle engaging the other of said bearings, said sleeve and spindle having long, short and cylindrical bearing portions engaging corresponding portions in said bearings, and lubricant feeding means in the base of each housing.

In testimony whereof I affix my signature in the presence of two witnesses.

JOSEPH SELIK.

Witnesses:
KARL H. BUTLER,
ANNA M. DORR.